(12) United States Patent
Wright et al.

(10) Patent No.: US 9,217,828 B2
(45) Date of Patent: Dec. 22, 2015

(54) OPTICAL FIBER PROTECTIVE TUBING ASSEMBLY

(71) Applicant: Tyco Electronics Corporation, Berwyn, PA (US)

(72) Inventors: William F. Wright, Williamstown, MA (US); David R. Radliff, Holly Springs, NC (US); Julian S. Mullaney, Raleigh, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 297 days.

(21) Appl. No.: 13/859,553

(22) Filed: Apr. 9, 2013

(65) Prior Publication Data

US 2013/0294733 A1  Nov. 7, 2013

Related U.S. Application Data

(60) Provisional application No. 61/622,820, filed on Apr. 11, 2012.

(51) Int. Cl.
| | | |
|---|---|---|
| *G02B 6/255* | (2006.01) | |
| *G02B 6/36* | (2006.01) | |
| *G02B 6/44* | (2006.01) | |
| *G02B 6/00* | (2006.01) | |
| *B29D 11/00* | (2006.01) | |
| *G02B 6/38* | (2006.01) | |

(52) U.S. Cl.
CPC .......... *G02B 6/2558* (2013.01); *B29D 11/0075* (2013.01); *G02B 6/255* (2013.01); *G02B 6/3801* (2013.01); *G02B 6/443* (2013.01); *G02B 6/4471* (2013.01); *G02B 6/3887* (2013.01); *G02B 6/4402* (2013.01); *G02B 6/4432* (2013.01)

(58) Field of Classification Search
CPC .... G02B 6/255; G02B 6/2558; G02B 6/3801; G02B 6/3887; G02B 6/4402; G02B 6/443; G02B 6/4432; G02B 6/4471; B29D 11/0075; C03C 25/1065
USPC ............. 385/53, 75–78, 86, 95–99, 100, 102, 385/104, 109, 111, 136; 264/1.25
See application file for complete search history.

(56) References Cited

U.S. PATENT DOCUMENTS

| | | |
|---|---|---|
| 2,027,962 A | 1/1936 | Currie |
| 3,086,242 A | 4/1963 | Cook et al. |

(Continued)

FOREIGN PATENT DOCUMENTS

WO   WO 02/093227 A1   11/2002

OTHER PUBLICATIONS

International Search Report and Written Opinion for PCT/US2013/035904 mailed Jul. 26, 2013.

*Primary Examiner* — Akm Enayet Ullah
*Assistant Examiner* — Michael Mooney
(74) *Attorney, Agent, or Firm* — Merchant & Gould P.C.

(57) ABSTRACT

An apparatus for use in a fiber optic network includes a furcation tube having a first end and a second end. An optical fiber passes through the furcation tube, the optical fiber having an end portion that extends outwardly beyond the second end of the furcation tube. A heat-recoverable tube fixes the optical fiber relative to the furcation tube adjacent the second end of the furcation tube, the heat-recoverable tube having a first portion affixed to the furcation tube and a second portion affixed to the end portion of the optical fiber.

27 Claims, 5 Drawing Sheets

(56) References Cited

U.S. PATENT DOCUMENTS

| | | |
|---|---|---|
| 3,597,372 A | 8/1971 | Cook |
| 5,469,521 A | 11/1995 | Coutts et al. |
| 5,470,622 A | 11/1995 | Rinde et al. |
| 5,838,861 A | 11/1998 | Bunde |
| 6,278,831 B1 | 8/2001 | Henderson et al. |
| 6,623,181 B1 | 9/2003 | Daems |
| 7,512,308 B2 | 3/2009 | Barnes et al. |
| 8,041,166 B2 | 10/2011 | Kachmar |
| 2005/0276551 A1 | 12/2005 | Brown et al. |
| 2007/0263964 A1* | 11/2007 | Cody et al. ............ 385/100 |
| 2010/0278493 A1 | 11/2010 | Kachmar |

\* cited by examiner

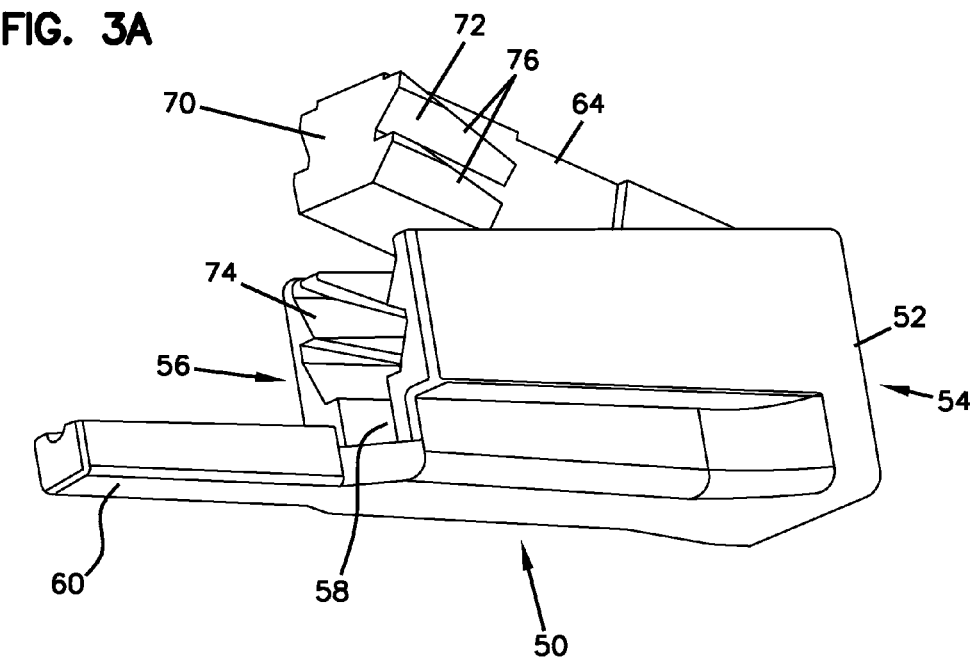
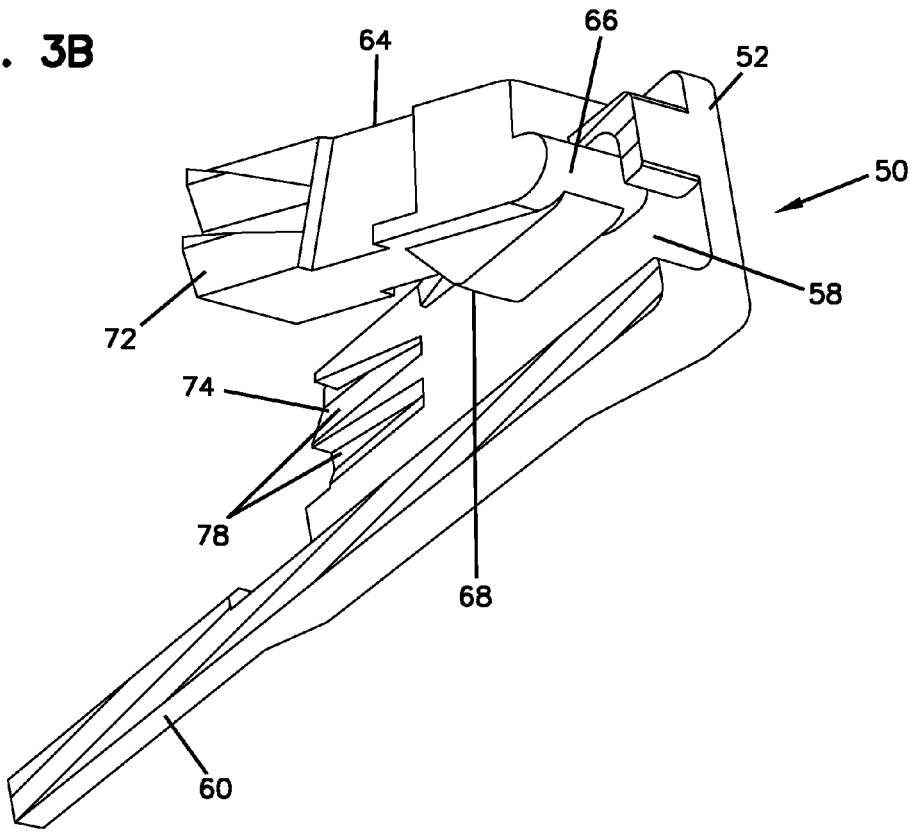

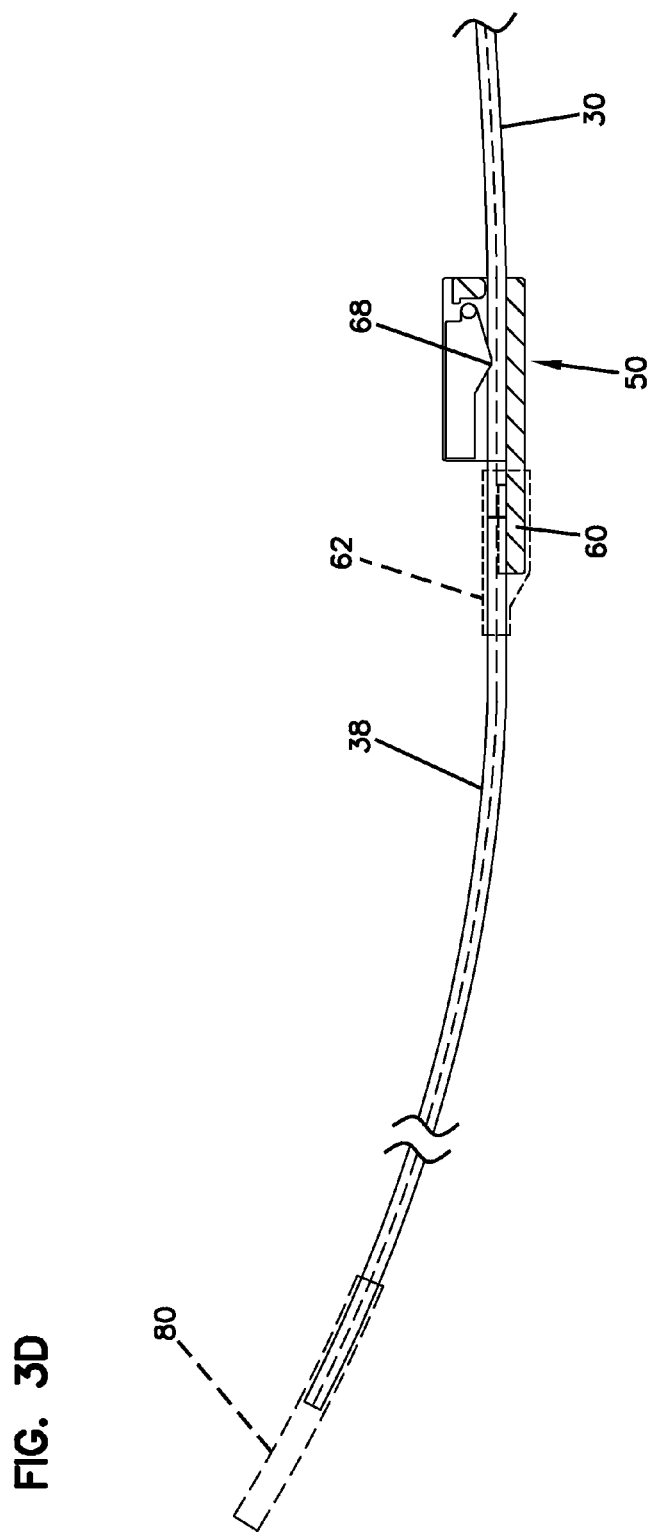

OPTICAL FIBER PROTECTIVE TUBING ASSEMBLY

CROSS-REFERENCE TO RELATED APPLICATION

The present patent application claims the benefit of U.S. Provisional Patent Application Ser. No. 61/622,820, filed Apr. 11, 2012, which application is hereby incorporated by reference in its entirety.

TECHNICAL FIELD

The present disclosure relates generally to equipment used in fiber optic communications networks. More particularly, the present disclosure relates to apparatuses and methods used for the splicing of optical fibers in fiber optic networks.

BACKGROUND

Fiber optic communication systems are becoming prevalent in part because service providers want to deliver high band width communication capabilities to customers. Fiber optic communication systems employ a network of fiber optic cables to transmit large volumes of data and voice signals over relatively long distances. A typical fiber optic network may include a system of trunk fiber optic cables including optical fibers. Fiber optic networks also include drop cables that interconnect to fibers of the trunk cables at various locations along the lengths of the trunk cables. The drop cables can be routed from the trunk cables to subscriber locations or to intermediate structures such as drop terminals.

Optical fibers of cables (e.g., drop cables, trunk cables, etc.) are often connected to connectorized pigtails via splices (e.g., fusion splices). Splices are typically supported within splice trays. Such closures typically include sealed ports through which the trunk cables and drop cables enter the closures. While splice trays are effective for protecting splices (e.g., fusion splices) and for managing the optical fibers routed to and from splice locations, splice trays can be relatively large. Thus, at least for certain applications, splice trays can be a limiting factor in achieving high density in fiber optic connectivity.

Alternative methods and equipment for splicing of optical fibers in a fiber optic network are desired.

SUMMARY

Certain aspects of the present disclosure relate to compact and cost effective arrangements for splicing of optical fibers in a fiber optic network. Certain aspects of the present disclosure relate to compact and durable/rugged configurations for splicing connectorized pigtails to an optical fiber of a fiber optic cable.

According to one inventive aspect, the disclosure relates to an apparatus for use in a fiber optic network, the apparatus comprising a furcation tube having a first end and a second end, an optical fiber that passes through the furcation tube, the optical fiber having an end portion that extends outwardly beyond the second end of the furcation tube, and a heat-recoverable tube that fixes the optical fiber relative to the furcation tube adjacent the second end of the furcation tube, the heat-recoverable tube having a first portion affixed to the furcation tube and a second portion affixed to the end portion of the optical fiber.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosure herein are based.

BRIEF DESCRIPTION OF THE DRAWINGS

FIG. 1A is a cross-sectional view taken along section line 1A-1A of FIG. 1;

FIG. 3A illustrates a perspective view of an example fixation means used to fix the furcation tube to the buffer tube of the drop cable of the assembly of FIG. 1, the fixation means provided in the form of a clamp structure;

FIG. 3B illustrates a cut-away view of the clamp structure shown in FIG. 3A;

FIG. 3D illustrates the clamp structure of FIG. 3C in a locked orientation; and

DETAILED DESCRIPTION

The present disclosure relates generally to compact solutions for protecting optical fibers in a splice arrangement.

Figure 1:
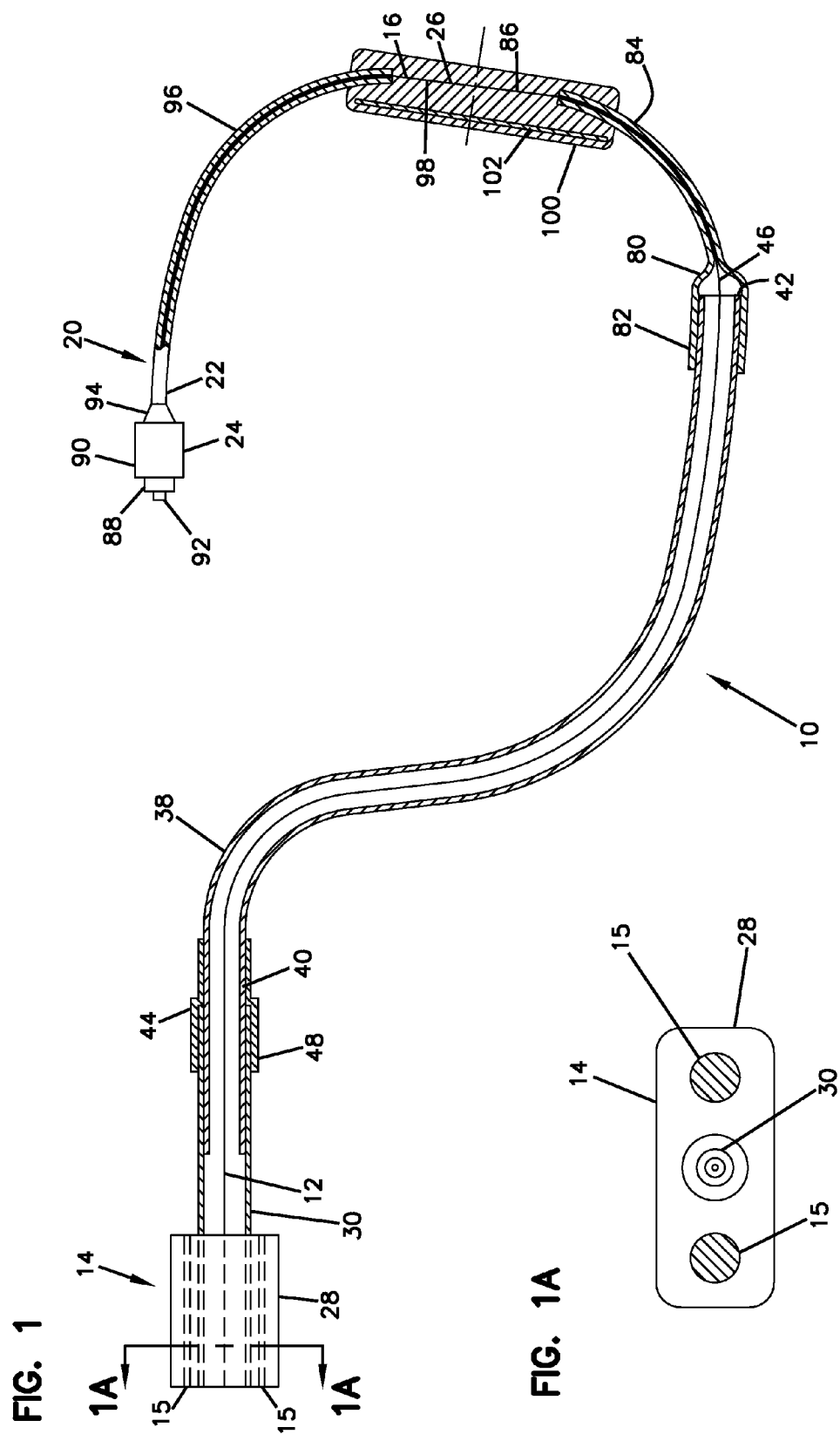
FIG. 1 illustrates an embodiment of an optical fiber protective tubing assembly in accordance with the principles of the present disclosure.
Figure 2:
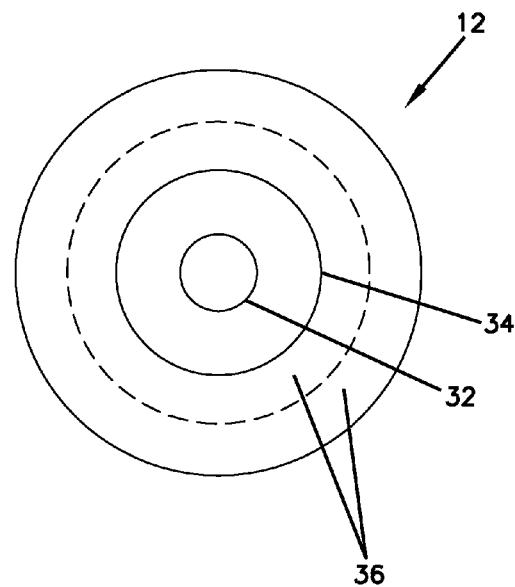
FIG. 2 is a transverse-cross sectional view of an optical fiber that is passed through a furcation tube of the protective tubing assembly of FIG. 1 in accordance with the principles of the present disclosure.

Referring to FIGS. 1 and 2, an optical fiber protective tubing assembly 10 having features that are examples of inventive aspects in accordance with the principles of the present disclosure is illustrated.

In the illustrated example, the protective tubing assembly 10 is used in splicing a first optical fiber 12 (e.g., an optical fiber of a flat drop cable 14 having strength members 15, see FIG. 1A) to a second optical fiber 16 (e.g., an optical fiber protected by a buffer layer such as a tight buffer layer 96). In the Figures, the second optical fiber 16 is part of a connectorized pigtail 20, wherein a first end portion 22 of the optical fiber 16 is terminated to a fiber optic connector 24 (e.g., an SC-type) and a second end portion 26 has been stripped of the buffer layer 96 and coating layers for splicing with the first optical fiber 12 as will be described in further detail below. The strength members 15 can be anchored to provide strain relief.

In accordance with an exemplary method of splicing the first optical fiber 12 to the second optical fiber 16, an outer cable jacket 28 of the drop cable 14 is stripped to expose a length of loose buffer tube 30 (e.g., having an outer diameter of about 900 microns) of the drop cable 14. The buffer tube 30 is then further stripped to expose a length of the first optical fiber 12.

A transverse cross-sectional view of the optical fiber 12 that is exposed after the buffer tube 30 has been stripped is shown diagrammatically in FIG. 2. The exposed optical fiber 12 includes a core 32 having an outer diameter of about 10 microns. A cladding layer 34 having an outer diameter of about 125 microns surrounds the inner core 32. One or more coating layers 36 having a total outer diameter of about 250 microns surround the cladding layer 34. In certain embodiments of the optical fiber used in the splice arrangement of the present disclosure, the coating layers 36 have a total outer diameter that is less than 400 microns. In certain embodiments, the coating layers 36 have a total outer diameter that is less than 300 microns. In certain embodiments, the coating layers 36 have a total outer diameter that is less than 270 microns. In certain embodiments, the total outer diameter of the coating layers 36 is in the range of 230 to 270 microns. In certain embodiments, the total outer diameter of the coating layers 36 is in the range of 240 to 260 microns.

It will be appreciated that the outer jacket 28 of the optical fiber 12 can be made of any number of different types of polymeric materials. In one embodiment, the outer jacket 28 is made of a medium density ultra-high molecular weight polyethylene.

The buffer tube 30 can also be made of any number of different polymeric materials. For example, the buffer tube 30 can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used.

The inner core 32 of the optical fiber 12 may be made of a glass material, such as a silica-based material, having an index of refraction. The cladding layer 34 is also normally made of a glass material, such as a silica based-material. The cladding layer 34 normally has an index of refraction that is less than the index of refraction of the core 32. This difference between the index of refraction of the cladding layer 34 and the index of refraction of the core 32 allows an optical signal that is transmitted through the optical fiber 12 to be confined to the core 32.

The inner layer of the one or more coating layers 36 is normally a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer functions to protect the optical fiber 12 from microbending. If the optical fiber 12 has more than one coating layer 36, the outer layer is normally a polymeric material having a higher modulus of elasticity than the inner coating layer 36. The higher modulus of elasticity of the outer layer functions to mechanically protect and retain the shape of optical fiber 12 during handling. According to another example embodiment, the one or more coating layers 36 may include acrylate as a material. Further details of examples of optical fibers are described in U.S. Pat. No. 8,041,166, the entire disclosure of which is incorporated herein by reference.

After a length of the optical fiber 12 has been exposed, a furcation tube 38 is placed over the optical fiber 12. The furcation tube 38 includes a first end 40 and a second end 42. The first end 40 of the furcation tube 38 is configured to be affixed to the buffer tube 30 of the drop cable 14 via a fixation means 44. The furcation tube 38 is preferably sized or cut such that the optical fiber 12 has an end portion 46 that extends outwardly beyond the second end 42 of the furcation tube 38 after installation. For the purposes of the present disclosure, the end portion 46 of the optical fiber 12 is defined as that portion that extends outwardly beyond the second end 42 of the furcation tube 38.

According to certain embodiments, the furcation tube 38 includes an outer diameter that is about 900 microns and inner diameter that is about 400 microns, thus allowing a 250 micron coated optical fiber 12 to pass freely through the tube 38.

As shown in FIG. 1, the embodiments disclosed herein can utilize a dimensionally recoverable article as the fixation means 44 to assist in fixing the first end 40 of the furcation tube 38 to the buffer tube 30 of the drop cable 14. In certain embodiments, the first end 40 of the furcation tube 38 is slid axially into the buffer tube 30 prior to fixation. In other embodiments, the furcation tube can slide axially over the buffer tube prior to fixation.

A dimensionally recoverable article is an article the dimensional configuration of which may be made substantially to change when subjected to treatment. Usually these articles recover towards an original shape from which they have previously been deformed, but the term "recoverable" as used herein, also includes an article which adopts a new configuration even if it has not been previously deformed.

A typical form of a dimensionally recoverable article is a heat-recoverable article, the dimensional configuration of which may be changed by subjecting the article to heat treatment. In their most common form, such articles comprise a heat-shrinkable sleeve made from a polymeric material exhibiting the property of elastic or plastic memory as described, for example, in U.S. Pat. No. 2,027,962 (Currie); U.S. Pat. No. 3,086,242 (Cook et al); and U.S. Pat. No. 3,597,372 (Cook), the disclosures of which are incorporated herein by reference. The polymeric material has been crosslinked during the production process so as to enhance the desired dimensional recovery. One method of producing a heat-recoverable article comprises shaping the polymeric material into the desired heat-stable form, subsequently crosslinking the polymeric material, heating the article to a temperature above the crystalline melting point (or, for amorphous materials the softening point of the polymer), deforming the article, and cooling the article while in the deformed state so that the deformed state of the article is retained. In use, because the deformed state of the article is heat-unstable, application of heat will cause the article to assume its original heat-stable shape.

In certain embodiments (e.g., in the depicted embodiments of the present disclosure), the heat-recoverable article is a sleeve or a tube 48 that can include a longitudinal seam or can be seamless. In certain embodiments, the tube 48 has a dual wall construction including an outer, heat-recoverable annular layer, and an inner annular adhesive layer. In certain embodiments, the inner annular adhesive layer includes a hot-melt adhesive layer.

In one embodiment, the heat-recoverable tube 48 is initially expanded from a normal, dimensionally stable diameter to a dimensionally heat unstable diameter that is larger than the normal diameter. The heat-recoverable tube 48 is shape-set to the dimensionally heat unstable diameter. This typically occurs in a factory/manufacturing setting. The dimensionally heat unstable diameter is sized to allow the heat-recoverable tube 48 to be inserted over two components desired to be coupled together. After insertion over the two components, the tube 48 is heated thereby causing the tube 48 to shrink back toward the normal diameter such that the tube 48 radially compresses against the two components to secure the two components together. The adhesive layer is preferably heat activated during heating of the tube 48.

According to one example method, when performing a field operation, a craftsperson can install the heat-recoverable tube 48 over an end of the buffer tube 30 so that there is approximately 1 inch of overlap. The craftsperson can then insert the 250 micron coated fiber into the 900 micron furcation tube 38, after cleaning the gel/grease off the fiber. The first end 40 of the furcation tube 38 is then inserted axially into the buffer tube 30. As so inserted, the buffer tube 30 overlaps the furcation tube 38 and the heat-recoverable tube 48 overlaps both the buffer tube 30 and the furcation tube 38. The heat-recoverable tube 48 can then be heated and shrunken down onto the loose buffer tube 30 and the furcation tube 38. The adhesive material within the heat-recoverable tube 48 establishes a strong bond between the buffer tube 30 and the heat-recoverable tube 48 and between the furcation tube 48 and the heat-recoverable tube 48. This coupling of the buffer tube 30 to the 900 micron furcation tube 38 via the heat-recoverable tube 48 is completed first, and then the second end 42 of the furcation tube 38 is processed next, as will be discussed in further detail below.

Figure 3C:
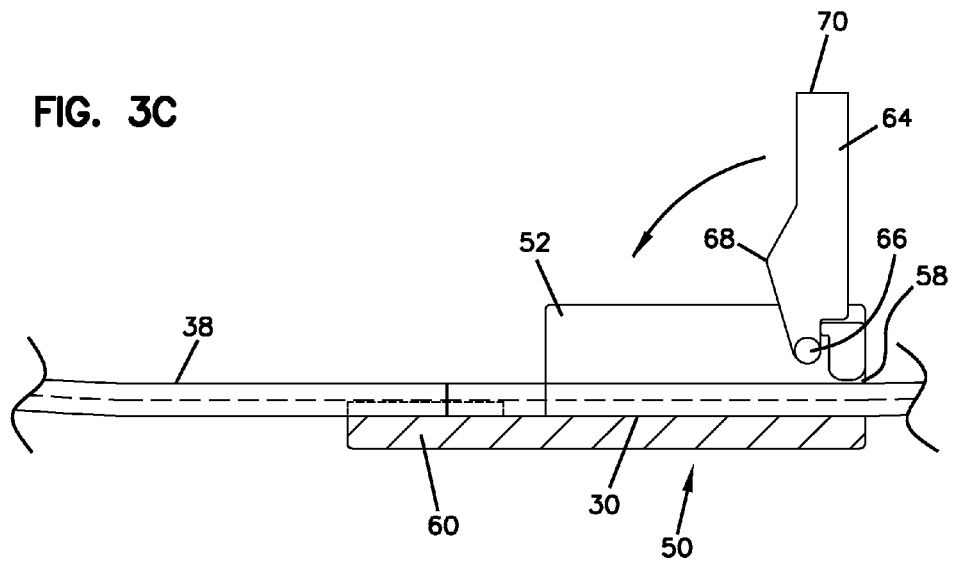
FIG. 3C illustrates a diagrammatic view of the clamp structure of FIG. 3A with the furcation tube affixed to the clamp structure and the buffer tube inserted within a bore of the clamp structure, the clamp structure shown in an unlocked orientation.

Alternatively, the fixation means 44 used to fix the furcation tube 38 to the buffer tube 30 may include a clamp structure 50. An example of a clamp structure 50 suitable for use in the protective tubing assembly 10 of the present disclosure is shown in FIGS. 3A-3D. Referring to FIGS. 3A-3D, the clamp structure 50 may include a main housing portion 52 having a first end 54 and a second end 56 and a bore 58 extending therethrough. Extending longitudinally from the second end 56 is a support structure 60. The support structure 60 is configured to provide a platform for affixing the furcation tube 38 to the clamp structure 50. According to one example embodiment, the furcation tube 38 can be fixed to the support structure 60 with further heat-recoverable tubing 62, as illustrated in FIGS. 3C-3D.

The buffer tube 30 of the drop cable 14 is first inserted through the bore 58 of the clamp structure 50 in a direction extending from the first end 54 toward the second end 56 of the main housing 52. The bore 58 and the support structure 60 are configured such that when the furcation tube 38 is placed over the exposed fiber 12 and is affixed to the support structure 60 of the clamp 50, the furcation tube 38 generally aligns with the buffer tube 30 that has been inserted through the bore 58 of the clamp 50, and in some embodiments can slide axially inside or axially over the buffer tube.

Clamp structure 50 further includes a lever arm 64 that is pivotable with respect to the main housing portion 52 via, for example, a living hinge 66. The lever arm 64 includes a camming lobe portion 68 that communicates with the bore 58 of the clamp structure 50 and that is used to press down on the buffer tube 30 for locking it in place. The camming lobe 68 is preferably sized so as to not damage the optical fiber 12 within the buffer tube 30.

A free end 70 of the pivotable lever 64 is provided with a first snap-fit structure 72 that is configured to interlock with a second snap-fit structure 74 provided on the main housing portion 52 for locking the buffer tube 30 in place after the lever 64 has been pivoted. As shown in FIGS. 3A and 3B, the first and second snap-fit structures 72, 74 may be provided in the form of protrusions 76 on the lever arm 64 and recesses 78 on the main housing portion 52. The protrusions 76 are angled outwardly from the lever arm 64 so as to be able to ride over portions of the main housing 52 forming the recesses 78 when the lever arm 64 is pivoted toward the main housing portion 52 and locked into place and so as to prevent their disengagement from the recesses 78 in an opposite direction. The recesses 78 include complementary shapes for providing the one-way interlock.

The clamp structure 50 is configured such that the amount of buffer tube compression is controlled by the amount of travel imparted to the lever arm 64. The desired amount of compression to the loose buffer tube 30 is preferably engineered to be enough to mechanically interfere and clamp the tube 30 in place, but to avoid creating interference with the optical fiber inside the loose buffer tube 30. Loose buffer tubes 30 can typically range from about 1.9 mm in outer diameter to 3.0 mm in outer diameter. According to certain embodiments, the clamp structure 50 can be configured to accommodate buffer tubes 30 of varying outer diameter. As such, the camming lobe portion 68 of the clamp 50 can be designed to provide varying amounts of interference based upon the travel of the cam-lever arm 64 for accommodating buffer tubes 30 of varying outer diameters. According to one example embodiment, the clamped buffer tube with the optical fiber therein along the clamping direction has a total outer dimension of about 1.5 mm. As such, if a 3 mm buffer tube is used, the resultant interference created by the cam lobe 68 must be about 1.5 mm. And, if a 2 mm buffer tube is used, the resultant interference created by the cam lobe 68 must be about 0.5 mm.

The clamp 50 may include a plurality of different interlock positions for locking the lever arm 64 to the main housing portion 52 for accommodating different sized buffer tubes 30. In this manner, depending upon the size of the loose buffer 30 clamped to the main housing 52, the varying profile of the cam lobe 68 can be utilized by locking the lever arm 64 in a plurality of discrete positions.

The bore 58 of the clamp structure 50 may include a dimension along the clamping direction of about 3.1 mm to accommodate loose buffer tubes of the varying sizes noted above. According to one example embodiment, the targeted compression location on the loose buffer tube 30 is about 12 mm from the end of the buffer tube. Thus, 12 mm of uncompressed tube could provide mechanical interference to the cam lobe 68 if the cam lobe 68 were pulled toward the end of the tube.

The clamp structure 50 or the portions of the clamp structure providing the controlled mechanical deformation to the loose buffer tube 30 can be made from a metal or a polymeric material.

In accordance with the protective tubing assembly 10, once the buffer tube 30 and the furcation tube 38 are affixed, the end portion 46 of the optical fiber 12 that extends outwardly from the furcation tube 38 receives another heat-recoverable tube 80. Similar to tube 48 that might be used to fix the furcation tube 38 to the buffer tube 30 of the drop cable 14, the heat-recoverable tube 80 utilizes a layer of heat recoverable material surrounding an adhesive layer. A first portion 82 of heat-recoverable tube 80 is affixed directly on the furcation tube 38 and a second portion 84 is affixed to the optical fiber portion 46 that extends beyond the furcation tube 38, as illustrated in FIG. 1. As such, the second portion 84 of heat-recoverable tube 80 is affixed on the one or more coating layers 36 around the cladding layer 34 of the optical fiber 12 (e.g., via adhesive or friction).

According to one embodiment of the protective tubing assembly 10 of the present disclosure, the optical fiber 12 is centered within the second portion 84 of the heat-recoverable tube 80 so that when heat-recoverable tube 80 is stripped to expose the optical fiber 12 for splicing, it can be done without damaging the optical fiber 12.

According to one example embodiment of the protective tubing assembly 10 of the present disclosure, the second portion 84 of heat-recoverable tube 80 that is affixed to the optical fiber 12 may have an outer diameter similar to the size of the outer diameter of the buffer tube of the connectorized pigtail 20. According to one embodiment, the second portion 84 of heat-recoverable tube 80 that is affixed to the optical fiber 12 has an outer diameter less than 1100 microns. According to another embodiment, the second portion 84 of heat-recoverable tube 80 that is affixed to the optical fiber 12 has an outer diameter less than 1000 microns. According to another embodiment, the second portion 84 of heat-recoverable tube 80 that is affixed to the optical fiber 12 has an outer diameter in the range of 850-950 microns. According to another embodiment, the outer diameter of the second portion 84 of heat-recoverable 80 may be between about 910 microns and 925 microns. The heat-recoverable tube 80 closely surrounds the coated fiber 12 and forms a tight or semi-tight buffer about the coated fiber 12.

According to one embodiment, heat-recoverable tube 80 is shrunk-down on the outer diameter of the optical fiber 12 such that the second portion 84 of heat-recoverable tube 80 has an inner diameter that matches the outer diameter of the optical fiber 12. For example, when the optical fiber 12 has an outer diameter less than 400 microns, the second portion 84 of heat-recoverable tube 80 has an inner diameter that is less than 400 microns. As another example, when the optical fiber 12 has an outer diameter less than 300 microns, the second portion 84 of heat-recoverable tube 80 has an inner diameter that is less than 300 microns. As another example, when the optical fiber 12 has an outer diameter in the range of 230-270 microns, the second portion 84 of heat-recoverable tube 80 is shrunk-down on the outer diameter of the optical fiber 12 such that the second portion 84 of heat-recoverable tube 80 has an inner diameter that is in the range of 230-270 microns.

After heat-recoverable tube 80 has been affixed to both the furcation tube 38 and the optical fiber 12 of the drop cable 14, a length of the second portion 84 of heat-recoverable tube 80 is stripped away to expose a length 86 of the optical fiber 12 that extends outwardly from heat-recoverable tube 80. When stripping heat-recoverable tube 80, the one or more coating layers 36 of the optical fiber 12 are also stripped at the same time to expose the cladding layer 34 of the optical fiber 12 or can be stripped in a subsequent step. As noted above, the exposed cladding layer 34 has an outer diameter of about 125 microns in certain embodiments of the optical fiber 12.

Still referring to FIG. 1, this exposed portion 86 of the first optical fiber 12 is the portion that is to be spliced (e.g., fusion spliced) to the second optical fiber 16 of the connectorized pigtail 20.

As noted above, the first end portion 22 of the connectorized pigtail 20 is terminated to a fiber optic connector 24 (e.g., an SC-type) and the second end portion 26 is the portion that is configured to be spliced to the first optical fiber 12. In a fiber optic connector having an SC footprint, a connector body 88 is surrounded by a slidable release sleeve 90 that is used to release the connector 24 from an SC-type fiber optic adapter, as is known in the art. An end of the first end portion 22 of the pigtail 20 is terminated to a ferrule 92 mounted at a front end of the connector body 88. The connector 24 includes a boot 94 at a rear end of the connector for providing bend radius protection to the second portion 26 of the pigtail that protrudes from the fiber optic connector 24.

The second portion 26 of the pigtail 20 that protrudes from the fiber optic connector 24 includes the tight or semi-tight buffer tube 96 that closely surrounds the second optical fiber 16. The second optical fiber 16 can have a construction similar to the first optical fiber 12. For example, the second optical fiber 16 can include a core having a diameter of about 10 microns, a cladding layer having an outer diameter of about 125 microns, and one or more coating layers having a total outer diameter of about 250 microns.

The tight buffer tube 96 may include an outer diameter of about 900 microns. And, similar to the first optical fiber 12, the second optical fiber 16, in certain embodiments, may include coating layers having a total outer diameter that is less than 400 microns. In certain embodiments, the coating layers may have a total outer diameter that is less than 300 microns. In certain embodiments, the coating layers may have a total outer diameter that is less than 270 microns. In certain embodiments, the total outer diameter of the coating layers may be in the range of 230 to 270 microns. In certain embodiments, the total outer diameter of the coating layers may be in the range of 240 to 260 microns.

According to the protective tubing assembly 10 and the splicing method of the present disclosure, the buffer tube 96 of the second end portion 26 of the connectorized pigtail 20 is stripped to expose a length 98 of the optical fiber 16 that extends outwardly from the tight buffer tube 96 of the pigtail 20. When stripping the tight buffer tube 96, the one or more coating layers of the second optical fiber 16 are also stripped at the same time to expose the cladding layer of the second optical fiber 16, or can be stripped at a subsequent step. As noted above, the exposed cladding layer has an outer diameter of about 125 microns in certain embodiments of the second optical fiber 16. Referring to FIG. 1, this exposed portion 98 of the second optical fiber 16 is the portion that is to be spliced (e.g., fusion spliced) to the first optical fiber 12 of the drop cable 14.

In splicing the first optical fiber 12 of the drop cable 14 to the second optical fiber 16 of the connectorized pigtail 20, a splice protection tube or sleeve 100 is used. The splice protection tube 100 is positioned over the splice between the first optical fiber 12 and the second optical fiber 16. According to the present assembly, the splice protection tube 100 is also a heat-recoverable tube that is affixed to the second portion 84 of the second heat-recoverable tube 80 and to the buffer layer 96 of the connectorized pigtail 20. Similar to heat-recoverable tubes 48, 80, the splice protection tube 100 includes a heat recoverable layer formed of a heat recoverable material surrounding an adhesive layer. In addition, the splice protection tube 100 includes a reinforcing rod 102 positioned inside the heat recoverable layer, wherein the reinforcing rod 102 is configured to extend across the splice and be adhesively affixed to the buffer layer 96 of the connectorized pigtail 20 and the second portion 84 of heat-recoverable tube 80. An example splice protection tube or sleeve similar to sleeve 100 and the method for use thereof are described in detail in U.S. Pat. No. 6,623,181, the entire disclosure of which is incorporated herein by reference.

According to one embodiment, both the second portion 84 of heat-recoverable tube 80 and the outer buffer layer 96 of the connectorized pigtail 20 are similarly sized in that each have an outer diameter in the range of about 850 to 950 microns. Furthermore, an active alignment device can be used to align the cores of the fibers 12, 16 prior to splicing. Because the fiber 12 is tightly covered by the tube 80 and the tube 96 tightly covers the fiber 16, the tubes 80, 16 can be held by the active alignment device during active alignment of the fibers 12, 16.

Figure 4:
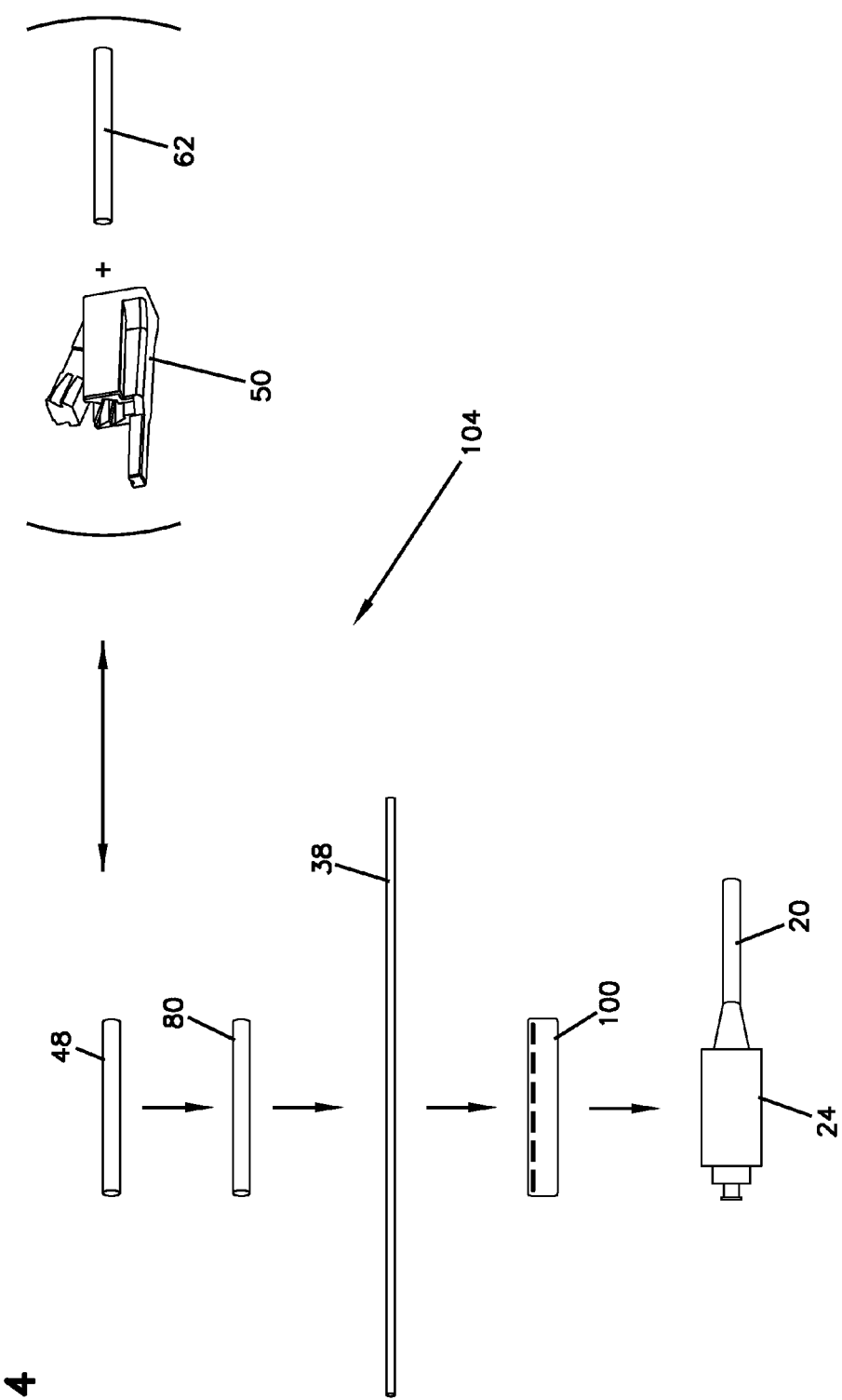
FIG. 4 illustrates a kit for splicing a first optical fiber to a second optical fiber in accordance with the principles of the present disclosure.

Referring now to FIG. 4, the optical fiber protective tubing assembly 10 of the present disclosure may be provided in the form of a kit 104. The kit 104 can be supplied as a package containing telecommunications parts. According to one embodiment, the kit 104 includes the heat-recoverable tube 48 that is used to fix the furcation tube 38 to the buffer tube 30 of the drop cable 14 and the heat-recoverable tube 80 that is used to fix the optical fiber 12 of the drop cable 14 to the furcation tube 38 at the other end of the furcation tube 38. As noted previously, heat-recoverable tube 48 (the one that is used for fixing the furcation tube 38 to the buffer tube 30 of the drop cable 14) may be replaced by the clamp structure 50 and an additional heat-recoverable tube 62 that is used with the support structure 60 of the clamp 50. The kit 104 also includes a length of the furcation tubing 38. The kit 104 further includes the splice protection tube or sleeve 100 that is used to be positioned over the splice between the two optical fibers 12, 16. A fiber optic connector 24 with a pigtail 20 extending therefrom, wherein the pigtail 20 includes an optical fiber 16 having a 900-micron buffer tubing 96 is also included in the kit 104, as illustrated in FIG. 4.

From the foregoing detailed description, it will be evident that modifications and variations can be made in the devices or methods of the disclosure without departing from the spirit or scope of the inventive aspects.

What is claimed is:

1. An apparatus for use in a fiber optic network, the apparatus comprising:
    a furcation tube having a first end and a second end;
    an optical fiber that passes through the furcation tube, the optical fiber having an end portion that extends outwardly beyond the first end of the furcation tube;
    a heat-recoverable tube that fixes the optical fiber relative to the furcation tube adjacent the first end of the furcation tube, the heat-recoverable tube having a first portion affixed to the furcation tube and a second portion affixed to the end portion of the optical fiber.

2. The apparatus of claim 1, wherein the optical fiber has an outer diameter less than 400 microns, and wherein the second portion of the heat-recoverable tube is shrunk-down on the outer diameter of the optical fiber such that the second portion of the heat-recoverable tube has an inner diameter that matches the outer diameter of the optical fiber and is less than 400 microns.

3. The apparatus of claim 2, wherein the second portion of the heat-recoverable tube has an outer diameter less than 1100 microns.

4. The apparatus of claim 2, wherein the second portion of the heat-recoverable tube has an outer diameter less than 1000 microns.

5. The apparatus of claim 2, wherein the second portion of the heat-recoverable tube has an outer diameter in the range of 850-950 microns.

6. The apparatus of claim 1, wherein the optical fiber has an outer diameter less than 300 microns, and wherein the second portion of the heat-recoverable tube is shrunk-down on the outer diameter of the optical fiber such that the second portion of the heat-recoverable tube has an inner diameter that matches the outer diameter of the optical fiber and is less than 300 microns.

7. The apparatus of claim 6, wherein the second portion of the heat-recoverable tube has an outer diameter in the range of 850-950 microns.

8. The apparatus of claim 1, wherein the optical fiber has an outer diameter in the range of 230-270 microns, and wherein the second portion of the heat-recoverable tube is shrunk-down on the outer diameter of the optical fiber such that the second portion of the heat-recoverable tube has an inner diameter that matches the outer diameter of the optical fiber and is in the range of 230-270 microns.

9. The apparatus of claim 8, wherein the second portion of the heat-recoverable tube has an outer diameter in the range of 850-950 microns.

10. The apparatus of claim 8, wherein the optical fiber includes a core, a cladding layer around the core, and one or more coating layers around the cladding, and wherein the heat-recoverable tube is secured to an outermost one of the one or more coating layers.

11. The apparatus of claim 10, wherein the one or more coating layers include acrylate.

12. The apparatus of claim 1, wherein the optical fiber is centered in the second portion of the heat-recoverable tube.

13. The apparatus of claim 1, wherein the heat-recoverable tube includes a dual wall construction including a heat recoverable layer surrounding an adhesive layer.

14. The apparatus of claim 2, wherein the optical fiber corresponds to a fiber optic cable, wherein the optical fiber extends through a buffer tube of the fiber optic cable, and wherein the first end of the furcation tube is fixed relative to the buffer tube.

15. The apparatus of claim 14, wherein the first end of the furcation tube is fixed relative to the buffer tube by another heat-recoverable tube.

16. The apparatus of claim 14, wherein the first end of the furcation tube is fixed relative to the buffer tube by a clamp.

17. The apparatus of claim 14, wherein an end of the end portion of the optical fiber is spliced to a connectorized pigtail.

18. The apparatus of claim 17, wherein the connectorized pigtail includes a tight buffered optical fiber having a fiber optic connector mounted at one end of the tight buffered optical fiber, wherein the tight buffered optical fiber includes an outer buffer layer, wherein a splice protection sleeve is positioned over the splice, and wherein the splice protection sleeve is affixed to the outer buffer layer of the connectorized pigtail and to the second portion of the heat-recoverable tube.

19. The apparatus of claim 18, wherein the splice protection sleeve includes a heat-recoverable layer, an adhesive layer surrounded by the heat-recoverable layer and a reinforcing rod positioned inside the heat-recoverable layer, the reinforcing rod extending across the splice and being adhesively affixed to the outer buffer layer of the connectorized pigtail and to the second portion of the heat-recoverable tube.

20. The apparatus of claim 19, wherein the second portion of the heat-recoverable tube and the outer buffer layer have outer diameters that are both in the range of 850-950 microns.

21. The apparatus of claim 2, wherein an end of the end portion of the optical fiber is spliced to a connectorized pigtail.

22. The apparatus of claim 21, wherein the connectorized pigtail includes a tight buffered optical fiber having a fiber optic connector mounted at one end of the tight buffered optical fiber, wherein the tight buffered optical fiber includes an outer buffer layer, wherein a splice protection sleeve is positioned over the splice, and wherein the splice protection sleeve is affixed to the outer buffer layer of the connectorized pigtail and to the second portion of the heat-recoverable tube.

23. The apparatus of claim 22, wherein the splice protection sleeve includes a heat-recoverable layer, an adhesive layer surrounded by the heat-recoverable layer and a reinforcing rod positioned inside the heat-recoverable layer, the reinforcing rod extending across the splice and being adhesively affixed to the outer buffer layer of the connectorized pigtail and to the second portion of the heat-recoverable tube.

24. The apparatus of claim 23, wherein the second portion of the heat-recoverable tube and the outer buffer layer have outer diameters that are both in the range of 850-950 microns.

25. An apparatus for connectorizing an optical fiber of a fiber optic cable, the fiber optic cable including a buffer tube through which the optical fiber extends, the optical fiber including a core, a cladding layer around the core, and one or more coating layers around the cladding, an outermost one of the one or more coating layers defining an outer diameter of the optical fiber, the outer diameter of the optical fiber being in the range of 230-270 microns, the apparatus comprising:
    a furcation tube that receives the optical fiber, the furcation tube the having a first end and a second end, the optical fiber having an end portion that extends outwardly beyond the second end of the furcation tube;

a heat-recoverable tube that fixes the optical fiber relative to the furcation tube adjacent the second end of the furcation tube, the heat-recoverable tube having an adhesive layer positioned inside a heat recoverable layer, the heat-recoverable tube having a first portion affixed to the furcation tube and a second portion affixed to the end portion of the optical fiber, the second portion of the heat-recoverable tube being shrunk-down on the outer diameter of the optical fiber such that the second portion of the heat-recoverable tube has an inner diameter that matches the outer diameter of the optical fiber and is in the range of 230-270 microns;

a connectorized pigtail spliced to an end of the end portion of the optical fiber at a splice location, the connectorized pigtail including a tight buffered optical fiber having a fiber optic connector mounted at one end of the tight buffered optical fiber, the tight buffered optical fiber including an outer buffer layer;

a splice protection sleeve is positioned over the splice location, and wherein the splice protection sleeve is affixed to the outer buffer layer of the connectorized pigtail and to the second portion of the heat-recoverable tube; and the first end of the furcation tube being fixed relative to the buffer tube of the fiber optic cable.

26. The apparatus of claim 25, wherein the splice protection sleeve includes a heat-recoverable layer, an adhesive layer surrounded by the heat-recoverable layer and a reinforcing rod positioned inside the heat-recoverable layer, the reinforcing rod extending across the splice and being adhesively affixed to the outer buffer layer of the connectorized pigtail and to the second portion of the heat-recoverable tube.

27. The apparatus of claim 26, wherein the second portion of the heat-recoverable tube and the outer buffer layer have outer diameters that are both in the range of 850-950 microns.

* * * * *